UNITED STATES PATENT OFFICE.

JOSEPH FREEMAN GODDARD, OF HOLLOWAY, LONDON, ENGLAND.

MANUFACTURE OF CEMENT.

1,214,910.     Specification of Letters Patent.     Patented Feb. 6, 1917.

No Drawing.     Application filed May 5, 1915. Serial No. 26,008.

*To all whom it may concern:*

Be it known that I, JOSEPH FREEMAN GODDARD, residing at Holloway, London, N., England, have invented certain new and useful Improvements in the Manufacture of Cement; and I do hereby declare the following to be a full, clear, and exact description of the invention, such as will enable others skilled in the art to which it appertains to make and use the same.

This invention relates to a process for the production of an improved Portland cement, and which possesses the property of being to a remarkable degree waterproof, when used in the ordinary way, either with or without the addition of sand or other aggregate, the process also producing a cement having certain other improved properties to be described.

A process is already known for waterproofing or hardening cement, mortar, or concrete, wherein the cement, either with or without an aggregate is mixed with a solution of tannin or tannic acid in water and allowed to set, whereby the pores of the resulting mass are filled up, the mass thus becoming non-porous and impervious to water.

Now the present invention differs from that above referred to in that I have discovered that cement having the said properties of being waterproof and hardened to a considerably greater degree than resulted from such prior invention may be produced in a simpler and more convenient manner. This invention therefore relates not only to improvements in the quality of the product but also to improvements in the process for its production. Whereas the prior process was for treating cement after its manufacture, I am now able to produce the desired effect to a greater degree by a process which is adapted to be incorporated into the ordinary process of cement manufacture.

It is well known in the Portland cement trade that gypsum or other forms of calcium sulfate are added to the cement clinker before the same is ground to cement, the object being to lengthen the "setting time" and this procedure is particularly necessary where the clinker has been produced in rotary kilns. I have discovered that the waterproofing material *i. e.* tannin or tannic acid may advantageously be mixed or incorporated with gypsum or the like and added therewith to the clinker before grinding. Not only is this method of operation technically more convenient but probably owing to the more intimate mixture obtainable by my improved process a cement is obtained of exceptionally good qualities to be described.

The invention is carried out as follows:—

The waterproofing material, tannic acid or tannin is mixed with gypsum, or other suitable form of calcium sulfate, or like material for "slowing" cement, in the proportions of 1 part by weight of tannic acid or tannin, to 5 parts by weight of gypsum. The materials may be ground either before or after mixing, or any other convenient or known means for obtaining a good and uniform mixture may be employed. Sufficient water is then added to produce a paste, and the mixture is allowed to set or dry. It is then ground to a powder, and this powder consisting of gypsum or the like having tannic acid incorporated with it, is used for adding to the cement clinker before the latter is ground.

The amount of the treated gypsum to be added to the clinker will depend on the nature of the latter, and on the nature of the cement it is desired to obtain, and particularly on the setting time required, as it is well known that the setting time of Portland cement may be varied within limits by the addition of varying quantities of gypsum. It will generally be found however that an addition of treated gypsum corresponding to 0.8% by weight of the clinker will yield an average slow setting cement.

The grinding of the mixture of treated gypsum and clinker is usually carried out in a tube mill, and care should be taken that during the grinding the temperature of the materials being ground does not rise above that at which tannic acid might tend to decompose. I have found as a result of experiment that this temperature should not exceed 300° F.

Portland cement produced according to this invention is found to possess remarkable properties of waterproofing and strength, which is shown by the following results which I have obtained.

*Water resisting properties.*—Disks made up of cement produced according to this invention, and sand in the proportions of 1 of cement to 3 of sand were prepared, the disks being half an inch thick and about two and a half inches in diameter; similar disks of cement and sand were prepared with cement in all respects similar to the above, with the exception that the added gypsum had not been treated with tannin or, other similar material. Both kinds of disks were kept in moist air for 48 hours then placed in water for three weeks, and afterward kept in moist air for one week, the temperature of the water and air during the whole of this period of storage being in both cases 15° C. Both sets of disks were then submitted to the action of water under a pressure of 4 lbs. per square inch. Those made of the untreated cement were found to be wet through in 24 hours, while in those produced from my improved cement, the water was found to have penetrated through the upper surface of the disk to a maximum depth of one-twentieth of an inch after one month. Similar, but slightly better results were obtained where the disks were made up with 1 portion of cement to 2 portions of sand.

Similar results were obtained when disks made of cement manufactured according to this invention were tested for their water resisting powers at a pressure of 52-57 lbs. per square inch. These high pressure tests also showed remarkable results.

Bodies made with cement manufactured according to this invention are also found to have greatly increased tensile strength, although they may require a longer period to develop their strength than ordinary Portland cement bodies do, and by way of example, the following results obtained are given:—

Briquets of the usual pattern for testing cement were made up of both neat cement and cement and sand, the materials used and the quantities being in all respects similar, except that in the one case the cement used was ordinary Portland cement, while in the other a like cement was used, but the latter had previously been treated by the addition of 0.8% of treated gypsum to the bulk. The following breaking weights in pounds per square inch of net cross section were found, the figures being in such case the average of a number of experiments:—

| Time. | Neat cement. | Neat cement, (treated.) | Cement and sand. | Cement and sand, (treated.) |
|---|---|---|---|---|
| 7 days | 629.5 | 618 | 339. | 323. |
| 28 days | 730 | 701 | 374.5 | 445. |
| 90 days | 785. | 804. | 439.5 | 645. |

It will thus be seen that while the treated cement under experiment took longer than the plain cement to develop its strength, and this was particularly the case with neat cement bodies, the strength finally obtained is a far greater one.

It may well be that if the usual amount of gypsum added to the cement be lessened by the amount of the treated gypsum the setting times would be similar.

The soundness of the cement produced according to this invention is not affected, and samples tested by Le Chatelier's test showed practically no difference in expansion between ordinary Portland cement and that manufactured with the treated gypsum.

To summarize it may be said that according to this invention a Portland cement is produced which has remarkable waterproof properties, even at comparatively high pressures, and which is of great tensile strength. At the same time the method of manufacture has no detrimental effect on the soundness.

No attempt can be made here to explain the reason for increased strength or waterproof properties.

It is not desired to limit the invention to the precise quantities or proportions of materials stated as these may be varied to suit varying kinds of materials used or required.

I claim:—

1. The method of making Portland cement comprising mixing the clinker with gypsum previously treated or incorporated with tannic acid and grinding the mixture to cement, for the purposes described.

2. Portland cement consisting of a mixture of ground clinker and gypsum, said gypsum having incorporated therewith a tannin water proofing agent.

3. In the manufacture of Portland cement, mixing the clinker with gypsum previously treated or incorporated with tannin and grinding the mixture to cement, for the purposes described.

4. In the manufacture of Portland cement, mixing the clinker with gypsum previously treated and incorporated with tannic acid and grinding the mixture to cement.

5. In the manufacture of Portland cement, the process consisting in preparing a clinker, treating the gypsum with a tannin water proofing agent and drying the same, and grinding the clinker with the gypsum.

6. In the manufacture of Portland cement, the process consisting of preparing a clinker, treating the gypsum with a tannin water proofing agent and drying the same, and grinding the clinker with the gypsum, the temperature of the material being maintained below 300 degrees Fahr.

7. In the manufacture of Portland cement, the process which consists of preparing a clinker, treating the gypsum with sufficient tannin water proofing agent to cause the gypsum to set, grinding the gypsum, and grinding the gypsum with the clinker.

In testimony whereof I affix my signature in presence of two witnesses.

JOSEPH FREEMAN GODDARD.

Witnesses:
JAMES RUSSELL,
O. J. WORTH.

Copies of this patent may be obtained for five cents each, by addressing the "Commissioner of Patents, Washington, D. C."